March 1, 1927.   J. L. GUINAN   1,619,417
GRAIN CONDITIONER
Filed April 10, 1926

INVENTOR.
Joseph L. Guinan
BY
James W. Martin
ATTORNEY.

Patented Mar. 1, 1927.

1,619,417

UNITED STATES PATENT OFFICE.

JOSEPH L. GUINAN, OF OMAHA, NEBRASKA.

GRAIN CONDITIONER.

Application filed April 10, 1926. Serial No. 101,151.

The invention relates to grain conditioners and has for its object to provide means whereby air is preheated and forced upwardly through a bin of grain, thereby drying the same without the necessity of removing the grain from the bin which is now the present practice.

A further object is to provide means whereby a chemical may be taken up by the air and discharged with the air into the bin of grain for killing parasites therein.

A further object is to provide a grain conditioning device comprising a plurality of perforated pipes in the bottom of a grain bin and connected to a pipe leading to a hot air chamber of a furnace, and into which hot air chamber air is forced by a fan through a pipe. Also to provide a tank in connection with the fan pipe, and through which tank the air may be bypassed for impregnating the same with a chemical.

A further object is to provide the perforated pipes within the grain bin with a plurality of spaced discs disposed between the perforations, and which discs assist in deflecting the air discharged from the perforations upwardly and prevent excessive spreading of the air blast, thereby insuring the forcing of hot air through the entire body of grain within the bin.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 3:
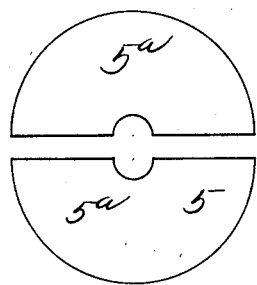
Figure 3 is a view in elevation of one of the sectional deflecting discs.
Figure 2:
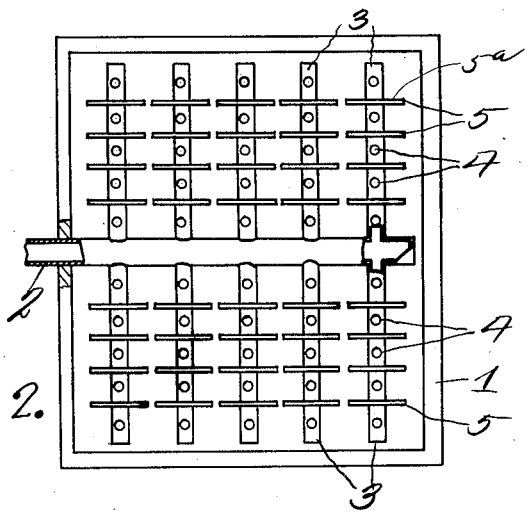
Figure 2 is a top plan view of the grain bin, showing the perforated pipes therein.
Figure 1:
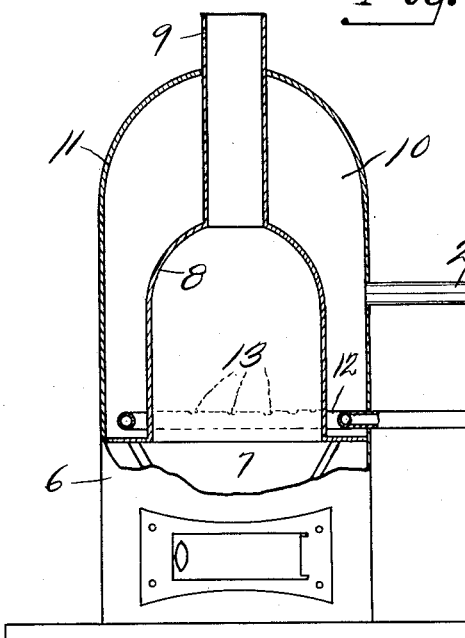
Figure 1 is a view in elevation of the device, parts being shown in section to better show the structure.
Figure 1:
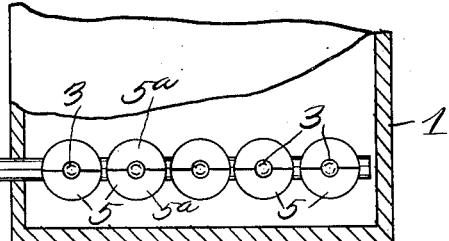
Figure 1:
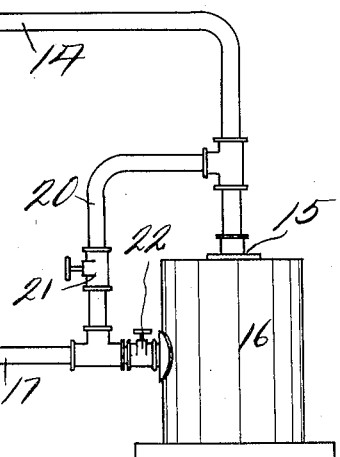
Figure 1:
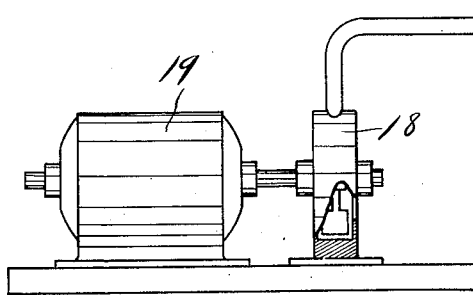

Referring to the drawing, the numeral 1 designates a conventional form of grain bin, and extending into said grain bin at one side thereof is a hot air supply pipe 2. The supply pipe is provided with a plurality of horizontally disposed branch pipes 3, the upper sides of which are provided with a plurality of discharge perforations 4, through which air is discharged upwardly through a body of grain in the bin. Surrounding the branch pipes 3 between the perforations 4 thereof are discs 5 which discs deflect the air blast upwardly and prevents excessive spreading of the blast of air, thereby insuring a uniform distribution of air through the body of grain. Discs 5 are formed from two sections 5ª which sections are secured together and to the branch pipes in any suitable manner, preferably by soldering or welding.

Disposed in any suitable position is a furnace 6, which furnace is provided with a fire pot 7 in which fuel is placed and entirely housing the upper side of the fire pot 7 is a dome 8, which terminates in a smoke stack 9, and heat radiated through the dome 8 and stack 9 heats the air in the air chamber 10 which is formed by the casing 11 surrounding the dome 8 and to which the hot air supply pipe 2 is connected. Surrounding the dome 8 adjacent its lower end is a pipe 12, which is provided with perforations 13, and connected to the pipe 12 is an air pipe 14, which pipe is connected at 15 to a tank 16 in which a chemical may be placed. The tank 16 is provided with a pipe 17, which leads to a conventional form of fan 18, and which fan is driven by a motor 19. Air from the fan 18 is forced through the pipe 17, and thence through the chemical tank 16, the pipe 14 and is discharged through the perforations 13 in the annular pipe 12 into the chamber 10 where it is thoroughly heated by the heat radiated from the drum 8, and thence it passes through the pipe 2 to the branch pipe 3. Connecting the pipe 14 and the pipe 17 is a by-pass pipe 20, and which by-pass pipe is provided with a valve 21 adapted to be closed when the air is being forced through the tank 16 for saturating the air with a chemical, however when it is not desired to use a chemical the valve 22 carried by the pipe 17 is closed and the valve 21 carried by the by-pass pipe 20 is open and this will allow the air to pass from the pipe 17 through the pipe 21 and to the pipe 14 without passing through the tank 16.

From the above it will be seen that a grain conditioning and drying device is provided, which is simple in construction, positive in operation and one wherein air is discharged upwardly from the horizontally disposed perforated pipes in the bottom of the bin 1, and the discs 5 will prevent excessive spreading of the air discharged from the perforations 4.

The invention having been set forth what is claimed as new and useful is:—

The combination with a grain bin, an air supply pipe extending into said bin adjacent its lower end, a plurality of horizontally disposed pipes carried by the air supply pipe and having perforations in their upper sides and a plurality of discs vertically disposed and surrounding the branch pipes between the perforations thereof.

In testimony whereof I hereunto affix my signature.

JOSEPH L. GUINAN.